Dec. 30, 1969  G. HERR ET AL  3,487,420

MOLDING STRIP FOR AUTOMOBILE BODIES

Filed March 4, 1968

INVENTORS
GERHARD HERR
WILLY O. TREBER
BY
OSTROLENK, FABER, GERB & SOFFEN
ATTORNEYS

United States Patent Office 3,487,420
Patented Dec. 30, 1969

3,487,420
MOLDING STRIP FOR AUTOMOBILE BODIES
Gerhard Herr, Wuppertal-Vohwinkel, and Willy O. Treber, Wuppertal-Elberfeld, Germany, assignors to Gebr. Happich G.m.b.H., Wuppertal-Elberfeld, Germany, a corporation of Germany
Filed Mar. 4, 1968, Ser. No. 710,210
Claims priority, application Germany, Mar. 18, 1967, H 62,177
Int. Cl. E04c 2/38; A44b 21/00
U.S. Cl. 52—98                      5 Claims

ABSTRACT OF THE DISCLOSURE

A molding strip for automobile bodies is disclosed having a plastic cover and a plastic end piece attached thereto by injection molding. The plastic cover is indented longitudinally along the molding strip and transversely adjacent the end piece so that portions of the cover may be peeled off the molding strip to expose underlying ornamental metallic surfaces.

BACKGROUND OF THE INVENTION

This application is a continuation-in-part of co-pending U.S. application Ser. No. 620,782, filed Mar. 6, 1967.

The present invention relates to molding strips and is more particularly concerned with the provision of prefabricated molding strips used for purposes of providing protection, covering and decorations primarily on the outer surface of an automobile body.

Molding strips for automobiles are well known. They generally comprise pressed or drawn metal carriers which are cambered and have limbs under which a sealing strip is to be laid when the molding strip is mounted upon the automobile body. The metal carriers are usually polished for ornamental purposes. As explained in the co-pending U.S. application Ser. No. 620,782, such molding strips generally present serious problems in their packaging for transit and in their assembly to the automobile bodies because of the great likelihood of damage to the polished surfaces of the molding strip.

For the above reasons and others more fully explained in the above mentioned co-pending U.S. application, a molding strip is proposed in said co-pending application having a protective covering thereon for the polished surfaces. The protective covering is applied to the molding strip simultaneously with the application of the underlying sealing strip. The protective covering is provided with indentations along predetermined lines so that it may be conveniently removed to expose the polished surfaces after the mounting of the molding strips to the automobile body.

While the molding strip of the above mentioned co-pending application has made a considerable improvement over prior molding strips, the handling of such molding strips has still remained very expensive because of the necessity of adequately sealing the end of the molding strip. Heretofore the ends of the molding strips were sealed with end pieces which had to be screwed on or fastened by some other means such as bonding, welding or clamping. Such end seals have not been satisfactory in that they did not provide proper sealing and they added considerable time and expense to the prefabrication of the molding strip and to the mounting of the molding strip to the automobile bodies.

It is the object of the instant invention to provide a molding strip which is completely prefabricated with fastening means and with sealed ends such that assembly to automobile bodies may be done simply, inexpensively and rapidly.

In one preferred embodiment of the instant invention, the molding strip is provided with a plastic cover over a metallic carrier and plastic end piece attached thereto by injection moldings. The plastic cover is provided with longitudinal indentations along the molding strip and with transverse indentations between the end pieces and the plastic covering. The molding strip is prefabricated with fastening elements inserted therein.

Since the molding strips are prefabricated with their ends sealed it is necessary to provide fastening elements which may be inserted into the grooves in the molding strip and secured thereto by rotating. For this reason, unique and novel fastening elements which are the subject of a co-pending application, U.S. application Ser. No. 709,984 filed of even date herewith, by the applicant of the instant application and entitled "Fastening Element For Molding Strips" (German patent application H 62,176, filed Mar. 18, 1967) are employed with the molding strip of the instant invention.

The sealing strips employed in the molding strip of the instant invention are formed integral with the covering and project into the grooves of the molding strip to provide lips enhancing the securement of the fastening element to the molding strip. The sealing strips are also provided with profilings which prevent the longitudinal displacement of the molding strip.

By producing the above prefabricated molding strip of the instant invention, it is possible to provide a molding strip which may be fastened to an automobile body by the simple insertion of the fastening element of the molding strip into fastening holes in the automobile body.

It is another advantage and object of the instant invention to provide a molding strip which may be easily secured to an automobile body without subsequent loosening due to transportation and vibration.

Another object of the instant invention is to provide a molding strip which will provide a complete seal.

It is a further object of the instant invention to provide a molding strip which is ornamental and which is free from risk of damage to the ornamental surfaces of the molding strip prior to the mounting of the molding strip upon an automobile body.

It is another object of the instant invention to provide a molding strip having a protective covering which may be peeled off simply and conveniently when such covering is no longer needed.

The above object, features and advantages of the instant invention along with other objects, features and advantages will become apparent upon a reading of the following detailed description of a preferred embodiment of the instant invention along with the drawings in which.

The reference numerals in the present drawings are the same as those for the corresponding parts in U.S. application Ser. No. 620,782 of which the present application is a continuation-in-part.

Figure 1:
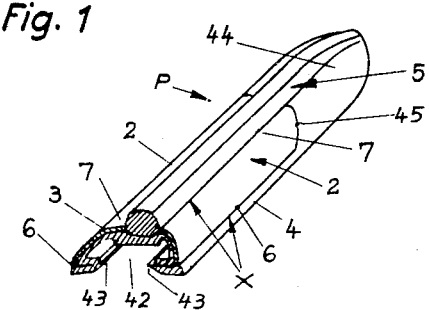
FIGURE 1 is a perspective view in approximately full scale of a so-called rub rail molding strip with an endpiece applied by injection molding a protective covering adapted to be peeled off in accordance with the instant invention.

Referring next to the drawings, in FIGURE 1 a molding strip is generally indicated as P. The molding strip P includes a carrier strip 1 carrying a suitably curved profile selected in accordance with the intended application of the molding strip P. The carrier strip 1 may be made of a corrosion resistant material such as stainless steel to provide a decorative appearance when exposed as to be explained hereinafter. The carrier strip 1 is completely covered by a plastic material. This covering consists of the outer layer 2, the inner layer 3, the feet or toe beads 4, and enlarged portion 5. The latter portion 5 is disposed on the end face of the molding strip. This covering of the plastics material defines the contour of the molding and is formed in known manner by extruding the plastic material onto the carrier 1. The covering 2 of the carrier 1 is provided with indented tear lines X extending in the longitudinal direction of the molding P to enable the removal of the covering 2 from predetermined areas. By tearing off the strip shaped section of the cover along the tear lines a decorative effect will then be afforded by the exposed surface of the carrier strip 1. The carrier 1 additionally serves to impart stability and stiffness to the molding piece.

The tear lines X consist preferably of indentations 6 and 7 in the outer cover 2. These tear lines extend in the longitudinal direction of the molding piece and de-limit the plastic layer 2 which is to be removed in accordance with the desired width of the surface of carrier 1 to be exposed.

Figure 2:
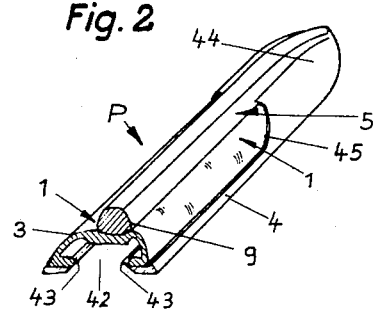
FIGURE 2 is a perspective view of the rub rail of FIGURE 1 with part of the protective covering peeled off and the polished metallic surface exposed.

FIGURE 2 is a view of the molding strip P with the sections of the covering 1 removed to expose the underlying carrier 1.

Figure 4:
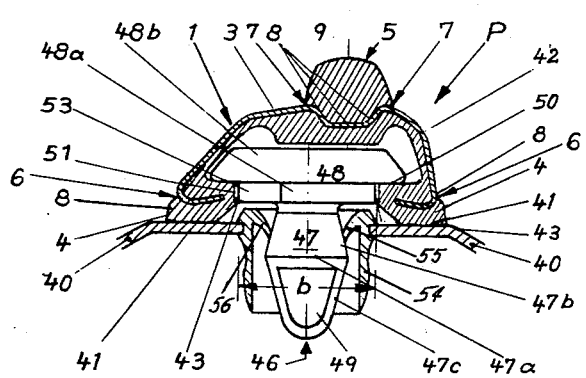
FIGURE 4 is a sectional view taken along with the line A through the rub rail of FIGURE 3.

In those areas in which the layer of plastic material is not to be removed, the carrier 1 is provided with perforations 8, as is designated most clearly in FIGURE 4. These perforations receive the plastic material in a plastic or flowable condition during the extrusion of the plastic material onto the carrier so that the outer layer 2 and the inner layer 3 are integrally joined together and the covering is firmly anchored in the carrier 1. In the same manner, particularly in the case of rub rails such as shown by way of example in the drawings, the protruding buffers 9 may be firmly connected to the molding strip as shown in FIGURE 4. The toe beads 4 which serve for sealing purposes are similarly anchored.

The toe beads 4 which are anchored to the molding strip as described above, provide a seal between the molding strip P and the body 40 of the vehicle. The bottom of the toe beads 4 are provided with profilings 41 in accordance with the instant invention to prevent the longitudinal displacement of the molding piece on the car body 40. Also on the toe beads 4, there are provided in integral fashion plastic lips 43 which are directed into the groove 42 of the molding strip for purposes to be explained hereinafter.

The ends of the molding piece are provided in accordance with the instant invention with an end piece 44 which is integral with the covering consisting of layers 2 and 3 and enlarged protrusion 5. Endpiece 44 is attached to these parts by injection molding. While only one endpiece is shown in FIGURES 1 and 2, it is to be understood that such endpiece is to be provided on both ends of the molding strip P. An indentation 45 is provided in the outer cover 2 near the end of the carrier 1 between the endpiece 44 and the remainder of the covering 2. The indented line 45 serves together with the tear line X to enable the removal of the predetermined area of the covering 2 by the simple peeling off of the covering by hand.

The molding P is produced with the endpiece 44 integral therewith in the following manner. The molding P is cut to the length desired and the ends of the molding strip are inserted into a mold which corresponds to the shape of the end piece desired. The mold is then filled with plastic in a fluid or plastic state in known manner. By the attachment of the endpiece 44 to the molding P by injection molding, the molding is produced having a completely closed outer covering and a groove 42 which is open only on the side facing the car body 40.

As a result of the molding strip P being closed at its ends by the endpiece 44, it is necessary to provide a fastening element which may be inserted into the groove 42 of the molding strip P and rotated therein to secure the fastening element to the molding strip. A unique and novel fastening element especially suitable for use with such molding strips is disclosed in the above mentioned copending U.S. application entitled "Fastening Element For Molding Strips." While the fastening element is fully described in said co-pending application, the disclosure of which is incorporated herein, the combination of the fastening element and molding strip will be briefly described hereafter.

Figure 3:
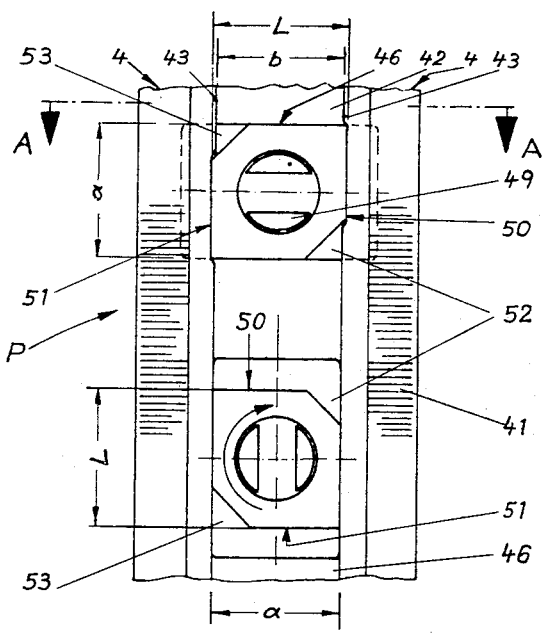
FIGURE 3 is an enlarged view of the underside of the rub rail showing the groove with one fastening clip inserted therein but not secured and a second fastening clip inserted and secured.

The fastening element can be basically seen in FIGURES 3 and 4 and is numbered 46. The fastening element 46 consists of a clip body 47 and a base plate 48. The clip body and base plate are preferably made integral. The clip body 47 is developed in the form of two conical frustrums 47b and 47c. The two conical frustrums 47b and 47c are connected to each other at their base surfaces 47a. The conical frustrum 47 is provided with a handle 49. The handle 49 may be provided as a pair of flat surfaces in the conical frustrum 47c opposite each other so as to be suitable for grasping the fastening element 46 by hand or by tool and turning it around its longitudinal axis. Alternatively, other suitable handles may be provided, for instance in the form of a slot in the conical frustrum 47C perpendicular to its longitudinal axis and adapted to receive tools such as a screw driver.

The base plate 48 is developed in the form of two rectangular plates 48a and 48b. These plates lie one above the other and are integral. The base plate 48 is made with the width a equal to or less than the width b of the molding groove 42 between the lips 43 of the molding P as can be seen clearly in FIGURE 3. The length L of the plate 48a is larger than the width b of the molding groove 42 by an amount necessary to provide firm clamping of the face sides 50 and 51 of the plate 48a between the elastic lips 43 of the molding P. As can be seen in FIGURE 3, two diagonally opposite corners 52 and 53 of the plate 48a are removed to permit rotation of the fastening element 46 in the groove 42, as to be explained hereinafter. The length of the plate 48b is substantially longer than the width b of the groove 42 of the molding P so that the fastening means 46 engages behind the toe beads 4.

In order to mount the molding strip P, the fastening elements 46 are first inserted in the molding groove 42 as shown for the lower fastening element in FIGURE 3. The fastening element is then rotated about its longitudinal axis in a clockwise direction to the position shown for the top fastening element in FIGURE 3. As can be seen, the cutaway corners 52 and 53 enable the rotation of the fastening element 46 without a substantial deforming of the molding strip resulting from the blocking of the rotation by the lips 43.

Once the fastening element 46 has been rotated in the positions shown for the upper fastening element in FIGURE 3, the clip body 47 may be inserted in bore holes in the car body as shown in FIGURE 4. The bore holes may be provided with additional clip means 54 having resilient arms 55 and 56 extending into the bore hole for securing the fastening element 46 within the holes by engaging the conical frustrum 47b.

As can be seen from the above, a new and novel molding strip has been disclosed which is completely prefabricated and which is provided with a protective covering so that ornamental surfaces may be protected during the packaging, transit and mounting of the molding strip upon the automobile body. The molding strips are provided with endpieces during their prefabrication to ensure proper sealing when the molding strip is mounted to an automobile body. The molding strips are further provided with unique fastening elements so that the molding strips may merely be pressed into corresponding holes in the body of the automobile to secure the molding strip thereto.

The above described molding strip of the instant invention provides simplicity and economy in both its manufacture and its subsequent mounting to an automobile body. It further significantly reduces the amount of time necessary to secure the molding strip to an automobile body.

While the instant invention has been described with respect to a preferred embodiment thereof, many modifications and variations will now become apparent to those skilled in the art. It is, therefore, preferred that the scope of the invention not be limited by the specific disclosure herein but rather by the appended claims.

The embodiments of the invention in which an exclusive privilege or property is claimed are defined as follows.

1. A molding strip particularly suitable for automobile bodies and the like comprising:
   an elongated carrier means;
   plastic material covering means surrounding said carrier means and extruded thereupon;
   plastic material endpiece means injection molded to said carrier means and being integral with said covering means;
   said covering means including indentation lines extending longitudinally of said carrier means and indentation lines adjacent said endpiece means transverse of said carrier means;
   said indentation lines defining severance lines in said covering for removal of covering portions within said indentation lines to expose said carrier means.

2. The molding strip of claim 1 wherein said elongated carrier means has a curved profile and a pair of elongated edges; resilient elongated feet means along said elongated edges; said feet means including profiling means for preventing longitudinal displacement of said molding strip when said molding strip is secured to an automobile body.

3. The molding strip of claim 2 wherein said elongated feet means defines a groove within said molding strip; elastic lip means integral with said elongated feet means and directed inwardly of said groove for cooperating with fastening means insertable within said groove to clamp and fasten said fastening means to said molding strip.

4. The combination of a molding strip and fastening element for motor-vehicle bodies, said molding strip comprising:
   an elongated carrier means;
   plastic material covering means surrounding said carrier means and extruded thereupon;
   plastic material endpiece means injection molded to said carrier means and being integral with said covering means;
   said covering means including indentation lines extending longitudinally of said carrier means and indentation lines adjacent said endpiece means transverse of said carrier means;
   said indentation lines defining severance lines in said covering for removal of covering portions within said indentation lines to expose said carrier means;
   said elongated carrier means having a curved profile and a pair of elongated edges; resilient elongated feet means along said elongated edges; said feet means including profiling means for preventing longitudinal displacement of said molding strip when said molding strip is secured to an automobile body;
   said elongated feet means defining a groove within said molding strip; elastic lip means integral with said elongated feet means and directed inwardly of said groove for cooperating with a fastening element insertable within said groove to clamp and fasten said fastening element to said molding strip;
   said fastening element comprising:
      a clip body insertable within a hole in the body of said motor-vehicle to secure said molding strip to said motor-vehicle;
      said clip body developed in the form of two conical frustrums connected by their base surfaces;
      said clip body further including handle means for rotating said fastening element;
      a base plate integral with said clip body and insertable within said groove in said molding strip;
      said base plate developed in the form of two substantially rectangular plates lying one above the other and having a width at least as small as the width of said groove;
      said base plate rotatable within said molding strip by said handle means to a position where a first of said rectangular plate is clamped against said lips and the second rectangular plate engages behind said feet of said molding strip.

5. The combination of claim 4 wherein two diagonally opposite corners of said first rectangular plate are removed to permit 90° rotation of said base plate within said groove.

References Cited
FOREIGN PATENTS
1,892,500      1963      Germany.

OTHER REFERENCES
Modern Plastics, vol. 31, No. 1, September 1953, pp. 98–99.

Protex Temporary Coating Process by American Anode Inc., Akron, Ohio, 3 pages.

JOHN E. MURTAGH, Primary Examiner

U.S. Cl. X.R.

24—73; 52—718